Dec. 10, 1957 A. F. REILLY, SR 2,815,636
VIBRATING HAY TEDDER ATTACHMENT FOR A HAY PICK-UP MECHANISM
Filed Sept. 20, 1956

INVENTOR.
Alfred F. Reilly, Sr
BY
Barlow & Barlow
ATTORNEYS.

United States Patent Office 2,815,636
Patented Dec. 10, 1957

2,815,636

VIBRATING HAY TEDDER ATTACHMENT FOR A HAY PICK-UP MECHANISM

Alfred F. Reilly, Sr., Taunton, Mass.

Application September 20, 1956, Serial No. 611,020

6 Claims. (Cl. 56—370)

The invention relates to a hay tedder apparatus or hay handling machine.

A major problem in treating hay having a high alfalfa content is the drying thereof. Ordinary hay can be field dried fairly easily. Heretofore, it was next to impossible to field dry alfalfa hay in a practical manner. If alfalfa was left for the sun to dry, it would take about four days to dry the same sufficiently to bale. In sun drying, much of the valuable vitamin contents is destroyed. Many of the leaves drop with a resulting loss of the valuable portions of the plant which contain the essential nutrient. Alfalfa is relatively heavy; and in cutting the plants, the stems lie parallel in swath which, when raked in windrows, tends to rope and pack. I have discovered that alfalfa hay may be field dried in a practical manner by opening the hay in the windrows in such a manner so as to destroy the parallelism of the stem and to fluff the hay to permit air to circulate through the hay which will remove most of the moisture contents by convection, thus retaining the leaves on the plant and with little loss of valuable vitamins.

An object of the invention is to provide a hay tedder so constructed as to pick up the hay from the windrows, and fluff and turn the same over to fall from the tedder on to the ground in a very loose, porous mass.

Another object of the invention is to provide a hay tedder which is so constructed as to operate on the hay in a manner to fall from the machine in an open condition with the stems extending in a plurality of directions so as to prevent excessive packing thereof.

A more specific object is to provide a hay making machine which will operate automatically to gather the hay from the ground and shake and turn the same to fall from the machine into a fluffy, porous mass.

Another object is to provide a machine of the above character wherein the hay will be gathered to be discharged on a vibrating platform to drop therefrom in a porous mass on the ground.

With these and other objects in view, the invention consists of certain novel features of construction as will be more fully described and particularly pointed out in the appended claims.

In the accompanying drawing:

Figure 4 is a diagrammatic end view of the tedder fork showing the arrangement of the individual rods one to the other.

Figure 1:
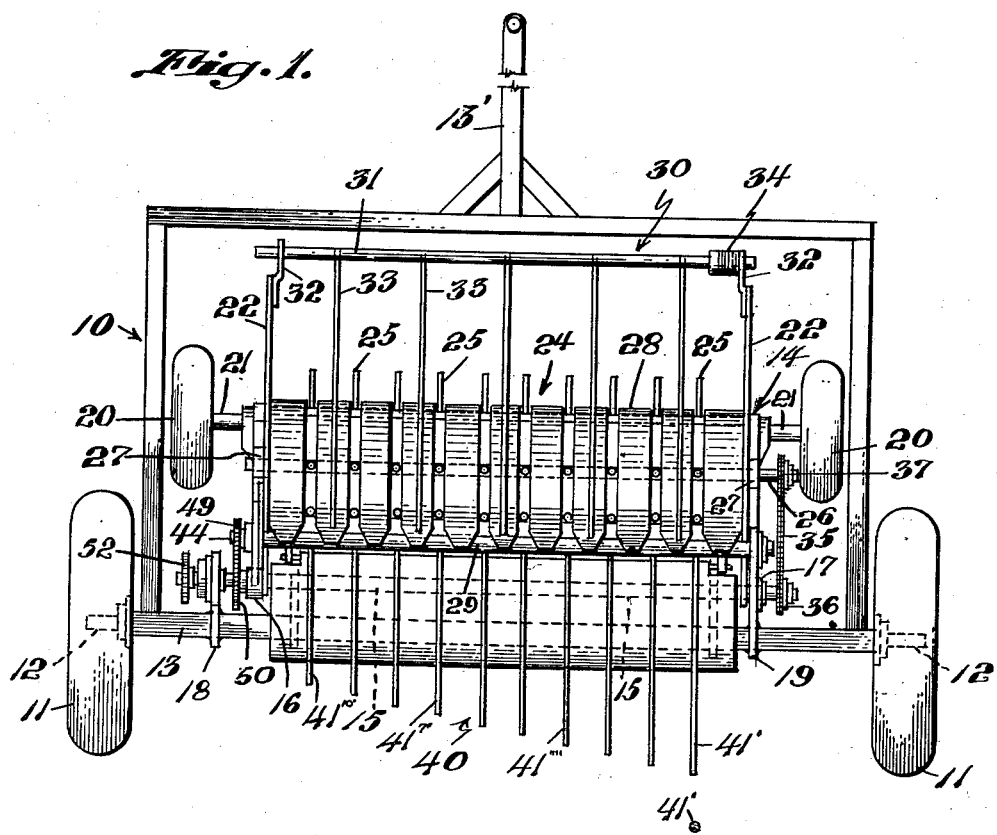
Figure 1 is a top plan view of a hay handling machine embodying my invention.
Figure 2:
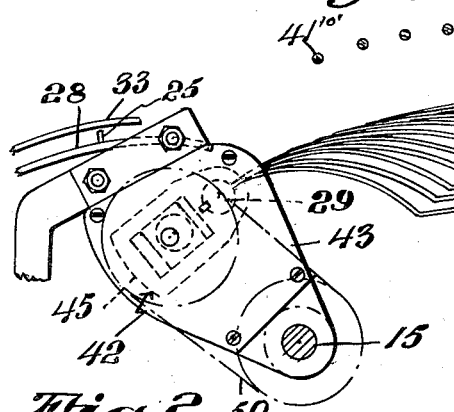
Figure 2 is a side elevational view of a fragmentary portion of the machine of Figure 1.

The machine according to the present invention comprises two units, a hay pickup unit and a hay tedder unit. These are arranged in tandem relation and supported on a common chassis which is adapted to be hitched to a farm vehicle, such as a tractor, to be pulled along previously made windrows of hay. The pickup mechanism gathers the hay from the windrow and conveys it to the tedder unit of the machine. The tedder unit comprises a plurality of spaced rods which may be referred to as a large fork having a plurality of tines of unequal lengths. The rods are vibrated in a manner which bounces the hay to open the same and at the same time turn the hay over to fall in a fluffy mass from the machine into a condition so as to permit a high degree of air to flow therethrough to hasten curing prior to the bailing thereof. The result, therefore, is to destroy the parallelism of the hay stems.

The hay handling machine illustrated comprises a main frame 10 or chassis of general rectangular shape which is supported at the rear end portion thereof on a pair of ground wheels 11 which are rotatably mounted on bearings indicated generally 12 secured at the outer end portions of the rear cross bar 13 of the chassis in a known manner. The front end of the chassis is provided with a tongue or draw bar 13' by means of which the machine is pulled along the ground, the machine being particularly adapted to be attached to a usual farm tractor. The chassis includes an inner frame 14 which is pivotally secured at the rear portion thereof to a power shaft 15 as by means of brackets 16 and 17 which carry bearings in which the said shaft 15 is journalled. The shaft 15 is secured to the cross bar 13 by brackets 18 and 19. The inner frame is supported from the ground by means of a pair of smaller diameter wheels 20 which are mounted on stub axles 21 fixed to the sides of the inner frame. Thus, in pulling the machine along the ground, the inner frame will follow the contour of the ground and maintain the required spaced relation therewith.

A hay pick-up mechanism indicated generally 24 is supported on the inner frame 14 and may be of any approved manufacture operable to pick up hay from the windrow and convey it to a location on the machine to be further acted upon, as will hereinafter appear. For purposes of detailed description of the pick-up unit, reference is made to the Russell Patent No. 2,674,839 and the part indicated by the symbol W. The unit herein shown is therefore of a known construction and briefly includes a skeletonized cylinder which carries a plurality of tines 25. A shaft 26 which is journalled in bearing 27 is secured to the frame 14 and mounts the said cylinder on the inner frame for rotation. The pick-up tines 25, revolve within the cylinder and which are arranged in rows extending in a generally radial direction. The tines are adapted to project between spaced apart stripper plates 28 which extend on a curvature and terminate at their upper ends at a location above a shaft 29 to be hereinafter referred to as the tedder shaft. The pick-up mechanism is provided with a usual wind guard 30 which comprises a rotatable rod 31 journalled in bracket bearings 32 that are secured to a pair of supports 22. Spaced holddown rods 33 are carried by the rod 31 and extend therefrom over the stripper plates 28 in spaced relation therewith and are biased toward said stripper plates 28 against a stop (not shown) by means of a torsion type spring 34. The shaft 26 is driven from the power shaft 15 through a chain drive comprising the endless chain 35 trained over the drive sprocket wheel 36 on the power shaft 15 and the driven sprocket wheel 37 on the shaft 26. Thus, as the machine is pulled along a windrow and the pick-up mechanism is in operation, the tines 25 will gather hay from the windrow and carry it upwardly along the stripper plates to deposit the hay on to a tedder mechanism indicated generally 40.

The tedder mechanism comprises a shaft 29 from which there projects a plurality of rods 41 which are shown as being substantially equally spaced apart. The rods 41 progressively increase in length toward the right end of the machine, as seen in Figure 1. However, the order may be reversed so that the rods will increase in length toward the left of the machine should this be desired.

Referring to Figure 4, it will be seen that the rods 41 are also angularly disposed in a substantially progressive order so as to position the longer rod indicated 41' at a higher level than the next adjacent rod and in turn the said next adjacent rod 41" being at a higher level than the next in line adjacent rod 41''', this order being continued so that the shorter of the rods 41 will be at the lowest level. The rods also extend on a downward curvature, as shown, and the free end of each rod is bent upwardly at an angle as shown. Thus, there is formed a platform on which the hay is discharged from the tines 25, the hay being caught on the platform by the upturned ends. As the hay is moved along the rods 41, the hay will ride and fall off the shorter rods first and be unbalanced, and the curvature of the rods and different elevations thereof will tend to turn the hay end upon end.

Figure 3:
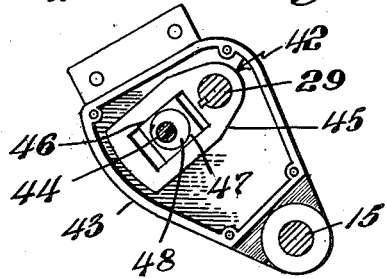
Figure 3 is a side elevational view of a member shown in Figure 2 with the closure plate thereof removed so as to expose the inner mechanism thereof.

The tedder shaft 29 is vibrated by means of an eccentric mechanism 42 (see Figures 3 and 4) which comprises a housing 43 in which one end of shaft 29 projects. A crank shaft 44 is journalled in said housing and is connected to shaft 29 by an arm 45 having a slidable block 46 provided with a bore 47 therethrough in which is received the crank disk 48 of the shaft 44. Thus, as the shaft 44 is rotated, the arm 45 will be caused to oscillate about the axis of shaft 29 and rock or vibrate said shaft 29. The shaft 44 is rotated by a suitable drive which is shown as a gear train 50 connected to the power shaft 15 which is in turn driven by a suitable power source (not shown) connected as at 52 and which may be an internal combustion engine.

During the operation of the machine, the hay gathered by the pick-up mechanism will be discharged on the rods 41 which are being vibrated by the oscillation of shaft 29. This will bounce and open the hay and turn it over end for end to be thrown to the ground beyond the rear of the machine in a fluffy condition by the upturned ends of rods 41 which give a pitchfork effect. This will allow air to flow therethrough in an easier manner and thereby hasten the curing thereof.

From the above description it will be apparent that the tedder mechanism functions in a manner which has substantially the same result as that of manually picking up the hay with a fork and shaking the fork to open the hay and turning the same to expose the hay which previously had lain at the bottom of the windrow.

I claim:

1. A hay handling machine comprising a rotary hay pick-up mechanism, a power shaft connected to said hay pick-up mechanism for operating the same, a hay tedder mechanism co-operating with said pick-up mechanism and having a plurality of rods extending generally in a horizontal plane on which the hay gathered by said pick-up mechanism is deposited, a vibrating mechanism connected to said rods for vibrating the same, and means for connecting said power shaft to said vibrating mechanism for operating the same.

2. A hay tedder mechanism for a hay pick-up mechanism, said tedder mechanism having a rockable shaft, a plurality of spaced apart rods secured to said shaft for movement therewith and extending therefrom generally in a horizontal plane and on which is deposited hay picked up from the ground by said pick-up mechanism, said rods extending from said shaft at different angular relation with the ground, and eccentric means connected to said shaft and operable for rocking said shaft so as to vibrate said rods to shake and open up hay deposited thereon.

3. A hay tedder mechanism for a hay pick-up mechanism, said tedder mechanism having a rockable shaft, a plurality of spaced apart rods secured to said shaft for movement therewith and extending generally in a horizontal plane and on which is deposited hay picked up from the ground by said pick-up mechanism, said rods being spaced apart along the length of said shaft and extending therefrom on a curvature from said shaft and each being progressively longer than the next adjacent rod relative to one end of said shaft, and eccentric means connected to said shaft and operable for rocking said shaft so as to vibrate said rods to shake and open up hay deposited thereon.

4. In combination, a hay pick-up mechanism and a hay tedder mechanism, said tedder mechanism having a rockable shaft, a plurality of curved rods, projecting from said shaft and secured thereto in spaced relation from one end of said shaft to the other, said rods each being progressively longer than the next adjacent rod relative to one end of said shaft and extending at different angular relation with the ground in a progressive order with the rod of longer length being at the higher level and the rod of shorter length being at the lowest level, a power shaft connected to said pick-up mechanism for operating the same, and a crank connection between said power shaft and said rockable shaft operable for rocking said shaft so as to vibrate said rods to shake and turn the hay deposited thereon by said pick-up mechanism.

5. A hay handling machine comprising an open frame wheeled chassis, a hay pick-up mechanism including a rotary shaft journalled to said chassis, a plurality of rows of hay pick-up tines extending radially relative to said shaft and connected thereto for rotation therewith a power shaft connected to said rotary shaft for rotating the same, a second shaft rockably mounted on said chassis, a plurality of rods secured at one end thereof to said second shaft for movement therewith, said rods projecting in space from said shaft and increasing progressively in length from one end of said second shaft to the other and extending progressively at different levels with the ground with the rod of longer length being at the highest level and the rod of shorter length being at the lower level, and an eccentric connected to said second shaft and operable for rocking the same to vibrate said rods so as to shake and open hay deposited thereon by said tines, and means connecting said power shaft to said eccentric for operating the same.

6. An attachment for a hay pick-up mechanism comprising a rockable shaft, a plurality of spaced curved rods secured at one end thereof to said shaft and projecting therefrom into space, said rods being progressively longer relative to end of said shaft than the next adjacent rod, said rods extending at different angular relation with the ground in a progressive order with the rod of longer length being at a higher level and the rod of shortest length being at the lowest level, and an eccentric connected to said shaft operable for rocking the same so as to vibrate said rods to shake and turn hay deposited thereon.

References Cited in the file of this patent
UNITED STATES PATENTS

| | | |
|---|---|---|
| 413,556 | Reeder | Oct. 22, 1889 |
| 498,205 | Burdin | May 23, 1893 |
| 2,741,892 | Collette | Apr. 17, 1956 |